(12) United States Patent
Negri Samper et al.

(10) Patent No.: US 11,771,098 B2
(45) Date of Patent: Oct. 3, 2023

(54) PROCESS TO OBTAIN A ROUND SHAPED COLLAGEN CASING AND CASING OBTAINED BY THE PROCESS

(71) Applicant: VISCOFAN TECHNOLOGY (SUZHOU) CO., LTD., Jiangsu (CN)

(72) Inventors: Juan Negri Samper, Jiangsu (CN); Stefan Knapp, Weinheim (DE); Ansgard Kopatz, Weinheim (DE)

(73) Assignee: VISCOFAN TECHNOLOGY (SUZHOU) CO., LTD., Jiangsu (CN)

( * ) Notice: Subject to any disclaimer, the term of this patent is extended or adjusted under 35 U.S.C. 154(b) by 603 days.

(21) Appl. No.: 16/632,873

(22) PCT Filed: Jul. 16, 2018

(86) PCT No.: PCT/EP2018/069264
§ 371 (c)(1),
(2) Date: Jan. 21, 2020

(87) PCT Pub. No.: WO2019/016133
PCT Pub. Date: Jan. 24, 2019

(65) Prior Publication Data
US 2020/0163349 A1 May 28, 2020

(30) Foreign Application Priority Data
Jul. 20, 2017 (CN) .......................... 201710598019.4

(51) Int. Cl.
*A22C 13/00* (2006.01)
(52) U.S. Cl.
CPC ...... *A22C 13/0016* (2013.01); *A22C 13/0006* (2013.01); *A22C 2013/0059* (2013.01); *A22C 2013/0086* (2013.01)

(58) Field of Classification Search
CPC ............ A22C 13/0016; A22C 13/0006; A22C 2013/0086; A22C 2013/0059
USPC .................................. 426/105, 140; 428/34
See application file for complete search history.

(56) References Cited

U.S. PATENT DOCUMENTS

| | | | |
|---|---|---|---|
| 3,860,728 A | 1/1975 | Tanner et al. | |
| 4,356,201 A | 10/1982 | Winkler | |
| 6,436,456 B1 | 8/2002 | Erik | |

FOREIGN PATENT DOCUMENTS

| | | |
|---|---|---|
| DE | 23 08 065 A1 | 9/1974 |
| GB | 1 490 913 A | 11/1977 |
| WO | WO-94/07372 A1 | 4/1994 |

OTHER PUBLICATIONS

Zboralski et al. DE2308065 A1 Budenheim Rud A Oetker Chemie, machine translation of description. (Year: 1974).*
Gord et al. EP0338365A2 machine translation of description (Year: 1989).*
International Search Report and Written Opinion for PCT/EP2018/069264, dated Nov. 15, 2018.

* cited by examiner

*Primary Examiner* — Subbalakshmi Prakash
(74) *Attorney, Agent, or Firm* — MARSHALL, GERSTEIN & BORUN LLP

(57) ABSTRACT

The present invention relates to a process to obtain a round shaped collagen casing and to the casing obtained by the process, which is based on a post rounding of a straight collagen casing by controlled heat shrinking.

10 Claims, 3 Drawing Sheets

PROCESS TO OBTAIN A ROUND SHAPED COLLAGEN CASING AND CASING OBTAINED BY THE PROCESS

FIELD OF THE INVENTION

The present invention relates to a process to obtain a round shaped collagen casing and to the casing obtained by the process, which is based on a post rounding of a straight collagen casing.

BACKGROUND OF THE INVENTION

Most natural casings show round shape that is very versatile for example for ring bologna, ring liver sausage and mettwurst. The artificial casing industry continuously strives for developing competitive alternatives.

The U.S. Pat. No. 4,356,201 describes rounded collagen casing produced by the extrusion of a gas inflated collagen tube, deposited on specially designed rotating segments responsible for continuous transformation of said straight tube into a rounded shape and its further transportation as such through the production line during crosslinking and drying.

In variants of this basic technique, the extruded collagen tube may be immediately coagulated by ammonia treatment inside and water dissolved salt solutions outside according patent with publication number U.S. Pat. No. 6,436,456 for thin walled edible rounds or it may be extruded and dried in an acidic status for thicker walled non edible rounds.

This common technique consumes a lot of energy for drying and requires a lot of manpower for running and maintaining the complex production line. Furthermore the extrusion speed is limited. Due to the technically unavoidable friction some collagen is "rubbed off" and collected on the rotating transport rollers.

This weakens the resulting round shaped casing due to scuff and causes periodic production interruptions for cleaning.

The sensorial properties of round shaped artificial edibles are generally markedly worse than their natural alternatives.

These disadvantages are well-known to those skilled in the art. They are considered principally unavoidable due to the applied production technology.

Thus, from what is known in the art, it is derived that the development of a round shaped collagen casing and to the process to obtain it is still of great interest.

SUMMARY OF THE INVENTION

Inventors have found a process to obtain a round shaped collagen casing.

The process is based on post rounding of a straight collagen casing by controlled heat shrinking and the percentage of humidity and plasticizer of the casing. Although the heat shrinking of collagen is well-known, it has never been applied for post rounding of a straight collagen casing. Inventors assume that it has been excluded due to the expected/supposed structural damage of collagen. Inventors surprisingly found out, that heavy damage of collagen can be avoided, when these parameters are well controlled.

Therefore an aspect of the invention refers to a process to obtain a round shaped collagen casing comprising the steps of:

a) guiding a straight inflated collagen casing which has a humidity between the 12% to the 30% balanced to the total weight of the casing and contains collagen plasticizer between 12% to 24% balanced to the total weight of the casing and an inside gas pressure between 20 to 700 mbar to a heat transfer unit;

b) transferring heat energy to the casing by a heat transfer unit to obtain a round shaped collagen casing, wherein the temperature achieved in the innermost ring of the casing is higher than the shrinkage temperature of collagen casing;

c) supporting the round shaped collagen casing by a round element.

In this invention the round shaped is obtained by the different reduction in length of the innermost and the outermost ring of the casing. The ring that achieves a higher temperature reduces more the length, this ring is named innermost ring. The innermost ring shrinks more than the outermost ring and the round shape is obtained. Please see the FIG. 3 wherein is described the parts of the round casing. The FIG. 3 describes the post rounded casing by its parameters, innermost ring of the post rounded casing (13), the outermost ring of the post rounded casing (14), the inner ring diameter of the post rounded casing (15), the outer ring diameter of the post rounded casing (16) and the calibre of the post rounded casing (17).

When the collagen casing has higher percentage of humidity and higher percentage of plasticizer than the percentages cited in the first aspect of the invention, the risk of heat degradation of the casing is increased.

The rounded collagen casings of the present invention can be clearly differentiated from round shaped collagen casings of the conventional production technique because as the heat modified the collagen structure, the heat shrunk casing areas does not show the typical properties of intact collagen. The denaturing of collagen in the heat shrunk casing areas can be confirmed easily with conventional techniques that follow the change of properties in going from native to denatured collagen, as for example birefringence, that can be differentiated by means of a polarising microscope. Also, heat shrunk casing areas are lowered of the characteristic X-ray interference of intact collagen. Chemical detection methods as the degree of digestion achievable with a trypsin digestion, or the differential staining with a typical stain for Collagen such as Sirius Red, can reveal the difference between the zones of the casing subject to the present invention. A simple visual check during the method can see that collagen is not rubbed off around the inner ring periphery of the rounded casing differentiating between the subject of the invention and the subject of the conventional method.

Therefore another aspect of the invention is a round shaped collagen casing obtained by the process of the invention.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION OF THE INVENTION

Figure 1:
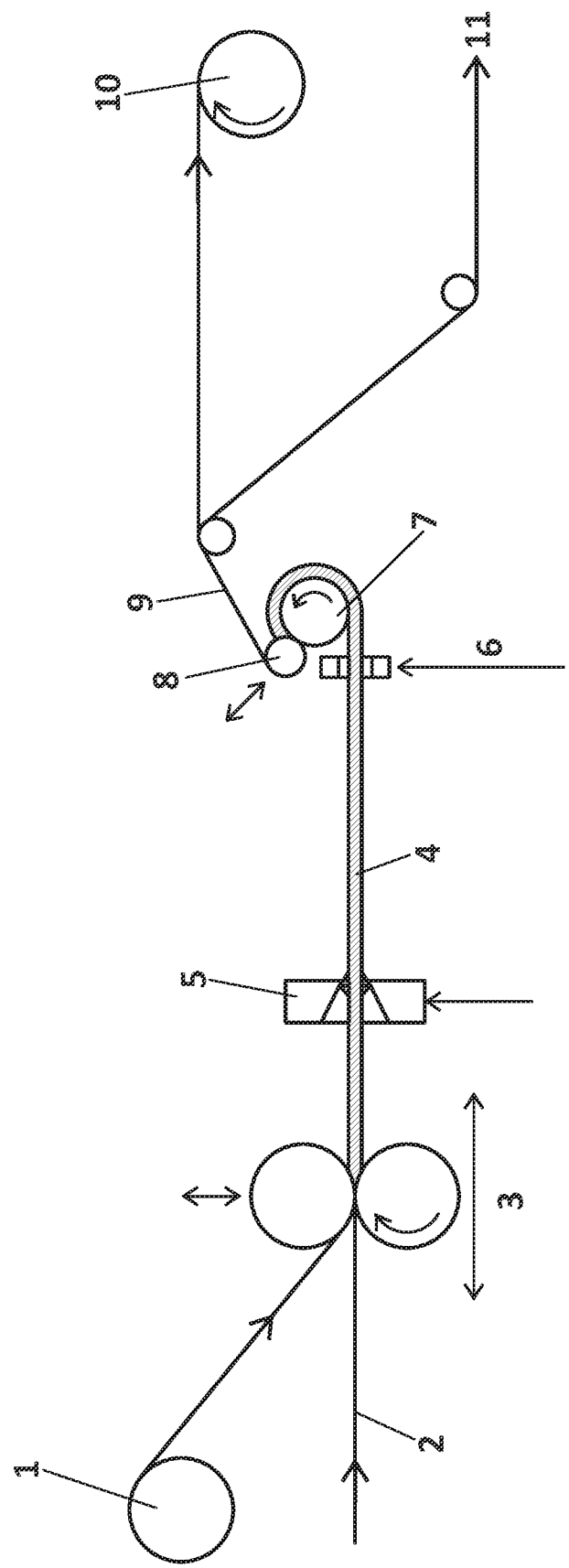
FIG. 1 schematically illustrates an exemplary design of the inventive post rounding method.

As mentioned above an aspect of the invention refers to a process to obtain a round shaped collagen casing comprising the steps of:

a) guiding a straight inflated collagen casing which has a humidity between the 12% to the 30% balanced to the total weight of the casing and contains collagen plasticizer between 12% to 24% balanced to the total weight of the casing and an inside gas pressure between 20 to 700 mbar to a heat transfer unit;

b) transferring heat to the casing by a heat transfer unit to obtain a round shaped collagen casing, wherein the temperature achieved in the innermost ring of the casing is higher than the shrinkage temperature of collagen casing;

c) supporting the round shaped collagen casing by a round element.

Preferably the straight collagen casing is any non-crosslinked or chemically or physically (e.g. thermally or UV) crosslinked straight collagen casing extruded out of bovine, porcine, ovine or any other fibrous collagen resource, including their mixtures.

The straight casing can be post rounded directly at the end of the production dryer prior to inline shirring or separately from reel to reel.

Preferably the distance between the heat unit and the innermost ring and the outermost ring is different. Preferably the heat transfer unit is selected from a blower or a temperature regulated wheeler. Preferably the round element is a thermoregulated round element. Preferably the round element is selected from: a roller or a wheeler. In a particular embodiment the heat transfer unit and the round element is the same thing and it is a temperature regulated wheeler.

When the heat transfer unit and the round element are not the same and the round element is a roller, more preferably the roller is maintained at a temperature between room temperature to the shrinkage temperature of the collagen casing and the inflated collagen casing is embraced around a roller at least to ¼ of a circle.

In an embodiment of the present invention the humidity of the straight inflated collagen casing is between 15% to 25% and more preferably is between 17.5% to 22.5% balanced to the total weight of the casing. More preferably the straight inflated collagen casing contains collagen plasticizer, between 14% to 22% and more preferably between 16.5% to 20% collagen plasticizer, balanced to the total weight of the casing. Particularly preferred the collagen plasticizer is glycerol.

Preferably the inflated collagen casing have an inside gas pressure between 50 to 400 mbar and more preferably 75 to 300 mbar.

When straight inflated collagen casing which has a humidity between the 12% to the 30% balanced to the total weight of the casing and contains collagen plasticizer between 12% to 24% and an inside gas pressure between 20 to 700 mbar, very reliable is the measurement of longitudinal heat shrink of a 5 mm wide stripe directly cut in the machine direction from the innermost and the outermost ring periphery of the post rounded casing measured at 80° C. in water. The inner ring stripe heat shrinks hereby far less than the outer ring stripe obeying the equation:

Longitudinal outer ring shrinkage/Longitudinal inner ring shrinkage>1.25

Corresponding casing stripes cut out of a round shaped collagen casing produced according to conventional method shows similar behaviour however more outbalanced always fulfilling the equation:

Longitudinal outer ring shrinkage/Longitudinal inner ring shrinkage<1.25.

Longitudinal heat shrink of the post rounded casing is measured according to the method described in IUP-Norm Nr. 16: Leder 15, 85 (1964) enclosed here by reference.

Therefore another aspect of the invention is collagen casing with a round shaped wherein the ratio, longitudinal outer ring shrinkage/longitudinal inner ring shrinkage is higher than 1.25.

In the FIG. 1 a particular process to obtain a round shaped collagen casing is described.

A straight collagen casing from a mother reel (1) or directly from the production dryer (2) is guided by means of the conveyor pair of rollers (3) through a water ring sprayer (5) and a ring blower (6), which is fed with heated air, not shown. The thermo regulated roller (7) builds together with the flattening small roller (8) the uptake pair of rollers. The starting straight collagen casing may be already adjusted to the requested humidity or it may be inline re-humidified by passing the water ring sprayer (5).

A permanently captured inflated casing bubble (4) is maintained between the conveyor pair of rollers (3) and the uptake pair of rollers, thermo regulated roller (7) and small roller (8). The conveying pair of rollers (3) is designed for axial back and forward movement commanded by a diameter laser measuring unit, not shown, to regulate the inflation pressure and consequently the calibre of the straight casing prior to post rounding. The inflated casing bubble (4) is embraced around the thermo regulated roller (7) having an outside diameter up to 750 mm, preferably up to 350 mm and especially between 65 mm and 200 mm, at least to ¼ of a circle, preferably to ⅘ and optionally to one or more turns of a circle.

Both conveyor pair of rollers (3) and thermo regulated roller (7) and small roller (8) are then started to rotate. Pressurised air heated to a temperature above the shrinking temperature of collagen is circumferentially directed along (4) through the air ring blower (6) directly positioned in front of the roller (7), which is internally thermo regulated by continuous water circulation, not shown in detail. The air ring blower (6) and the casing bubble (4) are excentrics. The air ring blower (6) can be optionally assisted by additional heated air blower, directed to the flanks while the casing bubble (4) is embraced around the thermo regulated roller (7). Passing the air ring blower (6) the inflated casing bubble (4) heat shrinks along its inner ring periphery and becomes hereby post rounded. The post rounded casing is then further conveyed as finished product, that is the post rounded casing (9) to the reeling unit (10) or directly into the shirring machine (11).

The smaller the diameter of stainless steel thermoregulated roller (7), the smaller is the inner ring diameter (15) of the resulting post rounded casing (9). The surface temperature of the thermoregulated roller (7) is maintained between room temperature and the shrinking temperature of the starting casing.

Higher inflation pressure inside the casing bubble (4) minimises the inner ring diameter (15) of the post rounded casing (9) equalising it more and more to the diameter of the thermoregulated roller (7). Decreased inflation pressure in the casing bubble (4) consequently increases the inner ring diameter (15) of the resulting post rounded casing (9).

Contact time between the casing bubble (4) and the thermoregulated roller (7) determines the post rounding speed. Longer contact time allows faster post rounding and vice versa. Maximum embracing of the casing bubble (4) around the thermoregulated roller (7) is preferred.

The temperature of the air flow through the air blower(s) (6) is always higher than the shrinkage temperature of the casing. It is however adjusted as low as possible to avoid excess heat degradation of the post rounded collagen casing (9).

The effective distribution of the heated air circumferentially around the casing bubble (4) is best achieved by positioning of the air ring blower (6) as close as possible to thermoregulated roller (7) as shown in FIG. 1. The flow rate of the heated air must be sufficient to actuate heat shrinking of the casing bubble (4).

The inner ring diameter (15) of the resulting post rounded casing (9) increases, when the uptake rollers, thermo regulated roller (7) and small roller (8) rotate faster and vice versa. Uptake rollers, thermo regulated roller (7) and small roller (8) however rotate principally slower than the conveyor pair of rollers (3) for realising post rounding.

Heavily crosslinked collagen casings require higher air temperatures blown trough the air blower (6) for heat shrinking and vice versa. Too high shrinking temperatures however should be principally avoided to avoid excess collagen degradation during post rounding.

The inventive method can be optimised according to these teachings by average researchers without leaving the frame of the present invention.

Some of the advantages of the present invention are: the process is carried out in a compacted rounding unit can be installed in line to the straight casing production or separately offline demanding only a limited space compared to the previous techniques. The energy demand of the process described in the present invention is minimised. Production logistics are extremely simplified, because mother reels of straight collagen casing are standard almost in all calibres. Deliveries to customers are therefore accelerated. The complex rotating segments of the conventional method requiring intensive maintenance and multiple man power are replaced by a simple and fully automated post rounding unit as exemplary shown in FIG. 1. No collagen is "rubbed off", therefore post rounded collagen casings having a thinner wall thickness can be produced, offering improved bite and chewing properties. The overall performance of the casings is improved, because it is no more limited by the specific technique of the prior conventional method.

In the following examples the invention is described in more detail however the invention is not limited by them.

EXAMPLES

Comparative Example A

The commercially marketed SCC calibre 21 of Viscofan S.A./Spain, according to the US patent specification 6,436,456 is a conventionally produced round shaped artificial collagen. It is selected for comparison purposes with the inventive examples 1 and 2.

Comparative Example B

Commercially available natural Sheep Saitling code A calibre 20/22 is further selected for comparison purposes with the inventive examples 1 and 2.

Comparative Example C

The commercially marketed "Kranzdarm" calibre 39 of Viscofan S.A./Spain is a conventionally produced round shaped non edible artificial casing. It is selected for direct comparison with the post rounded "Kranzdarm calibre 39" according to the inventive example 3.

Example 1

A straight collagen NDX casing calibre 21, commercialised by Viscofan S.A./Spain, having 22% humidity and 17% glycerol as plasticiser balanced to its total weight is post rounded as by heat shrinking.

The mother reel of the chemically crosslinked NDX casing (1) is manually reeled off, conveyed through the conveyor pair of rollers (3) and further through the air ring blower (6) around the thermo regulated roller (7) to the uptake pair of rollers built by the thermo regulated roller (7) and the small roller (8) as illustrated in FIG. 1.

Figure 2A:
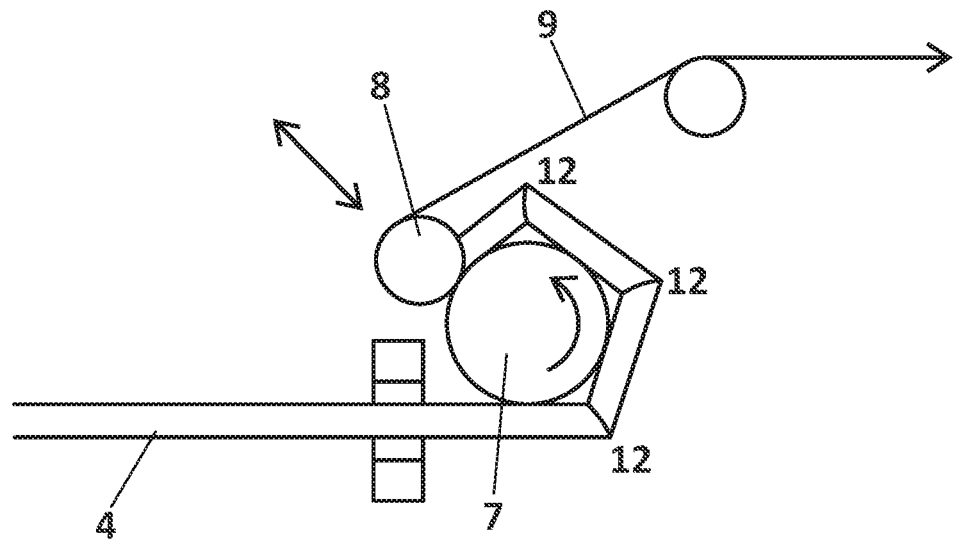
FIG. 2a illustrates the inflated casing tube before its heat shrinking.

The NDX casing is air inflated to 200 mbar and its bubble is captured between the conveyor pair of rollers (3) and the pair of rollers formed by the thermo regulated roller (7) and the small roller (8). The casing bubble (4) is next tightly embraced to ¾ around the thermo regulated roller (7) having a diameter of 115 mm. The casing bubble (4) hereby forms radial buckles (12) along its innermost ring (13) as shown in FIG. 2a.

A diameter laser, not shown in FIG. 1, regulates the desired inflation diameter of the captured casing bubble (4) to 20.80 mm by moving the platform carrying the conveyor pair of rollers (3) forward and/or backward.

The conveyor pair of rollers (3) are rotated at 13.3 meters/minute and the uptake pair of rollers built by the thermo regulated roller (7) and the small roller (8) are rotated at 10 meters/minute. Sufficient air flow, heated to 82° C. is circumferentially blown through the air ring blower (6) around the inflated casing bubble (4) just before it contacts the thermo regulated roller (7).

The thermo regulated roller (7) is thermo regulated to 40° C. by circulating warm water inside. Additional air flow of 82° C. can be specifically directed against the rings of the casing bubble (4) embracing the thermo regulated roller (7) by means of a U-shaped air blower not shown in detail.

Figure 2B:
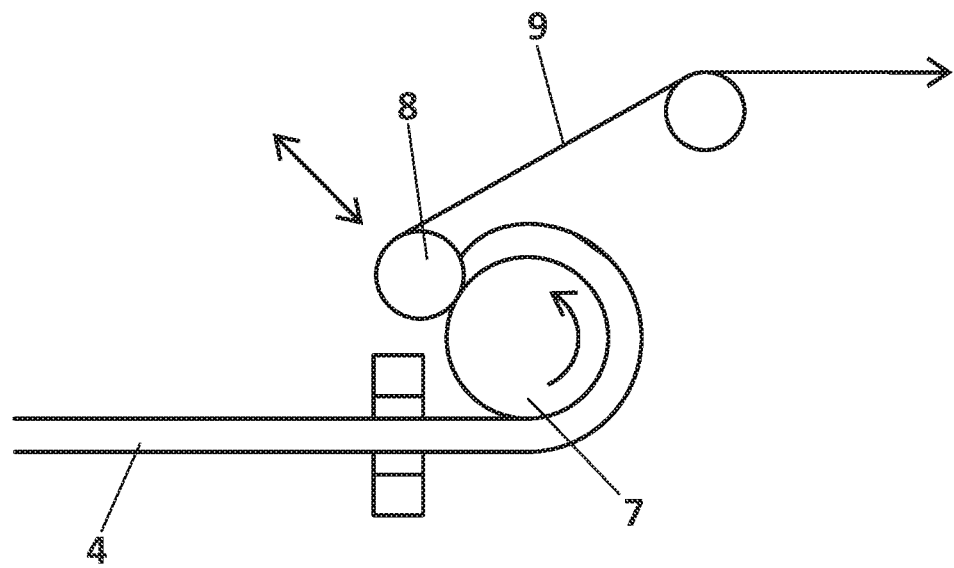
FIG. 2b illustrates the inflated casing tube after its transformation to a post rounded casing by heat shrinking.
Figure 3:
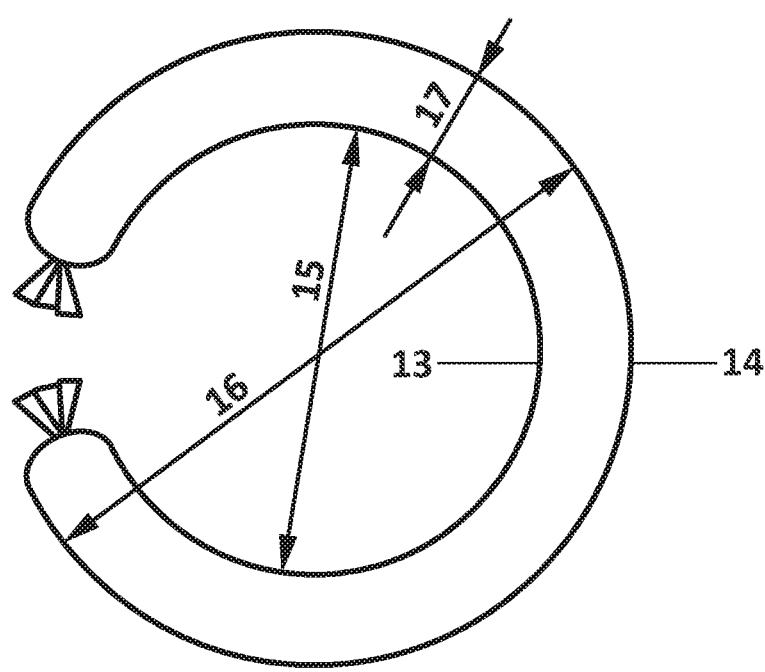
FIG. 3 explains the expressions for describing the post rounded casing.

The captured casing bubble (4) heat shrinks hereby along its innermost ring (13), becomes continuously rounded, while its radial buckles (12) disappear as shown in FIG. 2b. The rounded casing is flattened and uptake by the thermo regulated roller (7) and the small roller (8). The resulting post rounded casing (9) is then further conveyed to the reeling unit (10) or alternatively into the inline shirring machine (11).

The inner ring diameter (15) of the resulting post rounded casing measures 165 mm and its calibre 17 20.8 mm, when it is re-inflated to 200 mbar.

Simple visual check does not show any "rubbed off" collagen.

Two 5 mm wide longitudinal stripes directly cut out of the innermost and outermost ring periphery of the post rounded casing are heat shrunk in hot water at 80° C. according to the method described in IUP-Norm Nr. 16: Leder 15, 85 (1964).

Longitudinal outermost ring shrinkage: Sor
Longitudinal innermost ring shrinkage: Sir
Sor/Sir=1.364

The resulting post rounded casing of this inventive example 1 is directly compared with the casings of the comparative examples A and B:

Sor/Sir=1.19

The innermost ring shows the typical appearance of "rubbed off" collagen.

Example 2

A reel of straight collagen casing Colfan B calibre 19, commercialised by Viscofan S.A./Spain is post rounded by applying the same technique described in the inventive example 1.

| Croslinking | thermally crosslinked |
| --- | --- |
| Humidity | 21% balanced to the total weight |
| Glycerol | 16% balanced to the total weight |
| Inflation pressure | 150 mbar |
| Inflated calibre laser reading | 17.9 mm |
| Diameter of the stainless steel roller 7 | 130 mm |
| Hot air temperature for post rounding blown through 6 | 75° C. |
| Outside surface temperature of stainless steel roller 7 | 35° C. |
| Post rounding speed | 20 m/min. |
| Inner ring diameter of the post rounded casing 15 | 150 mm |
| Inflated calibre of the post rounded casing 17 | 17.8 mm |

No collagen is "rubbed off".

| Sir/Sor | 1.35 |
| --- | --- |

The resulting post rounded casing of inventive example 2 is further compared with casings of the comparative examples A and B:
Clear visual detection of "rubbed off" collagen along the inner ring.

| Sir/Sor | 1.19 |
| --- | --- |

Example 3

R2L-SR is a non edible straight collagen casing commercialised by Viscofan S.A. Pamplona/Spain. It is inline post rounded according to the following inventive example 1.

R2L calibre 39 directly taken from the production dryer is first guided along a casing collector buffer not shown in FIG. 1 for compensating speed deviations.

Casing humidity is enriched while passing the water ring sprayer (5) as described in FIG. 1.

R2L-SR is post rounded as described in inventive example 1.

| Crosslinking | chemical + thermal crosslinking |
| --- | --- |
| Humidity of the casing as it leaves the dryer | 11.7% balanced to the total weight |
| After enrichment | 18.7% balanced to the total weight |
| Glycerol | 14.0% balanced to the total weight |
| Inflation pressure | 300 mbar |
| Inflated calibre laser reading | 39.3 mm |
| Diameter of the stainless steel roller 7 | 180 mm |
| Hot air temperature blown through 6 | 85° C. |

-continued

| Crosslinking | chemical + thermal crosslinking |
| --- | --- |
| Outside surface temperature of roller 7 | 50° C. |
| Post rounding speed | 31 m/min. |
| Resulting inner ring diameter 15 | 195 mm |
| Resulting inflated calibre 17 | 39.4 mm |
| No collagen is rubbed off. | |
| Sir/Sor | 1.30 |

The resulting post rounded casing of this inventive example 3 is directly compared with the casing of the comparative example C:
Clear visual detection of rubbed off collagen along the inner ring.

| Sir/Sor | 1.10 |
| --- | --- |

The post rounded casing passes a second casing buffer, not shown in FIG. 1, is then further conveyed into the inline shirring machine.

Example 4

A reel of straight thin collagen casing Colfan JF caliber 17, commercialized by Viscofan S.A:/Spain is post rounded by applying the same technique described in the inventive example 1. Resulting casing has a small ring.

| Crosslinking | not crosslinked |
| --- | --- |
| Humidity | 19.2% balanced to the total weight |
| Glycerol | 21% balanced to the total weight |
| Inflation pressure | 350 mbar |
| Inflated calibre laser reading | 15.0 mm |
| Diameter of the stainless steel roller 7 | 130 mm |
| Hot air temperature for post rounding blown through 6 | 245° C. |
| Outside surface temperature of stainless steel roller 7 | 27.5° C. |
| Post rounding speed | 10 m/min. |

No collagen is "rubbed off".

| Sir/Sor | 1.30 |
| --- | --- |

Application Test

Foodstuff: "Wiener Sausage" (Traditional Recipe)

| 22 kg | lean pork |
| --- | --- |
| 18 kg | pork fat |
| 12 kg | ice |
| 1.040 kg | nitrite pickling salt (NPS) |
| 0.052 kg | diphosphate |
| 0.520 kg | Wiener spice mixture |
| 0.052 kg | white pepper |
| 0.026 kg | seasoning |

Pork, NPS and diphosphate are first chopped at moderate blade rotations. ⅓ of ice is added and chopping continued at increased blade rotations. At 0° C. another ⅓ of ice is added and chopping continued. Last step is repeated once again. At 3° C. emulsion temperature Wiener spice mixture and seasoning are added. At 4° C. pork fat is added and chopping is continued at increased blade rotations up to 12° C. As last step the meat emulsion is degassed at moderate blade rotations for additional 60 seconds.

Casing samples of comparative examples A and B as well as inventive examples 2 and 3 are stuffed with this Wiener emulsion on a Handtmann VF 80 vacuum filler, portioned and linked by the automatic Handtmann PA 30-7 to sausage chains consisting of 80 g sausages each.

All samples resisted the stuffing, portioning and linking without causing interruptions.

They are then hanged two sausages per turn and pasteurised at 76° C. according to standard guidelines. All Wiener resisted this thermal processing without scrap.

An expert panel consisting of 6 persons first checked the appearance of the finished Wiener, the results clearly underline, that the Wiener processed in the post rounded samples of the inventive examples 1 and 2 show a competitive overall appearance and are both superior to SCC of comparative example A and almost as good as natural Sheep Saitling of comparative example B regarding their sensorial properties.

The invention claimed is:

1. A process to obtain a round shaped collagen casing comprising the steps of:
   a) guiding a straight inflated collagen casing which has a humidity between 12% to 30% balanced to a total weight of the casing and contains collagen plasticizer between 12% to 24% balanced to the total weight of the casing and an inside gas pressure between 20 mbar to 700 mbar to a heat transfer unit;
   b) transferring heat energy to the casing by the heat transfer unit to obtain a round shaped collagen casing, wherein a temperature achieved in an innermost ring of the casing is higher than a shrinkage temperature of the collagen casing; and,
   c) supporting the round shaped collagen casing by a round element.

2. The process according to claim 1 wherein the straight inflated collagen casing has a humidity between 15% to 25% balanced to the total weight of the casing.

3. The process according to claim 1 wherein the straight inflated collagen casing contains collagen plasticizer between 14% to 22% balanced to the total weight of the casing.

4. The process according to claim 1 wherein the plasticizer is glycerol.

5. The process according to claim 1 wherein the heat transfer unit is a blower.

6. The process according to claim 1 wherein the round element is a thermoregulated round element.

7. The process according to claim 1 wherein the inflated collagen casing is embraced around a roller at least to ¼ of a circle, and the roller is maintained at a temperature between room temperature to the shrinkage temperature of the collagen casing.

8. A round collagen casing obtained by the process defined in claim 1.

9. A collagen casing characterized by a round shape wherein a ratio of longitudinal outer ring shrinkage/longitudinal inner ring shrinkage is higher than 1.25.

10. A collagen casing obtained by the process of claim 1 characterized by a round shape wherein a ratio of longitudinal outer ring shrinkage/longitudinal inner ring shrinkage is higher than 1.25.

* * * * *